(12) United States Patent
Xu et al.

(10) Patent No.: US 10,664,401 B2
(45) Date of Patent: May 26, 2020

(54) METHOD AND SYSTEM FOR MANAGING BUFFER DEVICE IN STORAGE SYSTEM

(71) Applicant: EMC IP Holding Company LLC, Hopkinton, MA (US)

(72) Inventors: Xinlei Xu, Beijing (CN); Jian Gao, Beijing (CN); Yousheng Liu, Beijing (CN); Changyu Feng, Beijing (CN); Geng Han, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/846,297

(22) Filed: Dec. 19, 2017

(65) Prior Publication Data

US 2018/0173629 A1 Jun. 21, 2018

(30) Foreign Application Priority Data

Dec. 21, 2016 (CN) .......................... 2016 1 1193465

(51) Int. Cl.
| | |
|---|---|
| *G06F 3/06* | (2006.01) |
| *G06F 12/0855* | (2016.01) |
| *G06F 12/0891* | (2016.01) |
| *G06F 12/0868* | (2016.01) |
| *G06F 12/0804* | (2016.01) |
| *G06F 12/123* | (2016.01) |
| *G06F 12/0897* | (2016.01) |

(52) U.S. Cl.
CPC .......... *G06F 12/0855* (2013.01); *G06F 3/061* (2013.01); *G06F 3/0659* (2013.01); *G06F 3/0689* (2013.01); *G06F 12/0804* (2013.01); *G06F 12/0868* (2013.01); *G06F 12/0891* (2013.01); *G06F 12/123* (2013.01); *G06F 12/0897* (2013.01); *G06F 2212/1024* (2013.01); *G06F 2212/22* (2013.01); *G06F 2212/222* (2013.01); *G06F 2212/502* (2013.01); *G06F 2212/601* (2013.01)

(58) Field of Classification Search
CPC ............ G06F 12/0855; G06F 12/0891; G06F 2212/1024; G06F 2212/22; G06F 2212/601
See application file for complete search history.

(56) References Cited

U.S. PATENT DOCUMENTS

| | | | |
|---|---|---|---|
| 5,680,573 A | * | 10/1997 | Rubin ................. G06F 12/0866 711/118 |
| 9,280,469 B1 | | 3/2016 | Kuang et al. |
| 9,864,683 B1 | | 1/2018 | Xu et al. |

(Continued)

*Primary Examiner* — Larry T Mackall
(74) *Attorney, Agent, or Firm* — BainwoodHuang

(57) ABSTRACT

A method and system for managing a buffer device in a storage system. The method comprising determining a first priority for a first queue included in the buffer device, the first queue comprising at least one data page associated with a first storage device in the storage system; in at least one round, in response to the first priority not satisfying a first predetermined condition, updating the first priority according to a first updating rule, the first updating rule making the updated first priority much closer to the first predetermined condition than the first priority; and in response to the first priority satisfying the first predetermined condition, flushing data in a data page in the first queue to the first storage device.

17 Claims, 9 Drawing Sheets

(56) References Cited

U.S. PATENT DOCUMENTS

| | | |
|---|---|---|
| 9,934,163 B1 | 4/2018 | Armangau et al. |
| 2003/0065646 A1* | 4/2003 | Joseph .............. G06F 17/30557 |
| 2009/0198879 A1* | 8/2009 | Tanaka ................ G06F 13/1673 |
| | | 711/103 |

* cited by examiner

METHOD AND SYSTEM FOR MANAGING BUFFER DEVICE IN STORAGE SYSTEM

RELATED APPLICATIONS

This application claim priority from Chinese Patent Application Number CN201611193465.9, filed on Dec. 21, 2016 at the State Intellectual Property Office, China, titled "METHOD AND APPARATUS FOR MANAGING BUFFER DEVICE IN STORAGE SYSTEM" the contents of which is herein incorporated by reference in its entirety.

FIELD

Various embodiments of the present invention relate to storage management, and more specifically, to a method and system for managing a buffer device in a storage system.

BACKGROUND

With the development of data storage techniques, various data storage devices now provide users with higher and higher data storage capacity, and also their data access speed has been increased greatly. Besides the increase of data storage capacity, users also impose greater and greater demands on data reliability and response time of storage systems.

A technical solution for building a storage system on the basis of multi-level storage media with different access speeds has been developed so far. For example, frequently used data may be loaded from a storage device with a lower access speed to a buffer device with a higher access speed, and further the buffer device may respond to access requests from the outside of the storage system. The technical solution can improve the efficiency in data response to some extent. However, since the buffer device itself is subjected to a limited space, only important data can be loaded thereto. Therefore, it becomes a focus of attention regarding how to prioritize data and how to allocate more storage pages to data with higher priorities in the buffer device and rationally schedule data pages in the buffer device.

SUMMARY

Therefore, it is desirable to develop and implement a technical solution that is capable of managing a buffer device more flexibly so as to reduce a response time of a storage system and further improve access performance of the storage system. It is desired that the technical solution can be compatible with existing storage systems and manage storage areas in the storage system more efficiently without extra hardware devices being added to existing storage systems.

In one embodiment of the present invention, there is provided a method for managing a buffer device in a storage system, comprising: determining a first priority for a first queue included in the buffer device, the first queue comprising at least one data page associated with a first storage device in the storage system; in at least one round, in response to the first priority not satisfying a first predetermined condition, updating the first priority according to a first updating rule, where the first updating rule makes the updated first priority much closer to the first predetermined condition than the first priority; and in response to the first priority satisfying the first predetermined condition, flushing data in a data page in the first queue to the first storage device.

In one embodiment of the present invention, there is provided a system for managing a buffer device in a storage system, the system comprising: one or more processors; a memory coupled to at least one processor of the one or more processors; computer program instructions stored in the memory which, when executed by the at least one processor, cause a device to execute a method for managing a storage system. The method comprises: determining a first priority for a first queue included in the buffer device, the first queue comprising at least one data page associated with a first storage device in the storage system; in at least one round, in response to the first priority not satisfying a first predetermined condition, updating the first priority according to a first updating rule, where the first updating rule makes the updated first priority much closer to the first predetermined condition than the first priority; and in response to the first priority satisfying the first predetermined condition, flushing data in a data page in the first queue to the first storage device.

In one embodiment of the present invention, there is provided a device for managing a buffer device in a storage system. The device comprises: a determining module configured to determine a first priority for a first queue included in the buffer device, the first queue comprising at least one data page associated with a first storage device in the storage system; an updating module configured to, in at least one round, in response to the first priority not satisfying a first predetermined condition, update the first priority according to a first updating rule, where the first updating rule makes the updated first priority much closer to the first predetermined condition than the first priority; and a flushing module configured to, in response to the first priority satisfying the first predetermined condition, flush data in a data page in the first queue to the first storage device.

With the technical solution of the present invention, storage pages may be allocated in the buffer device for more important data, data pages in the buffer device may be scheduled rationally, and further the storage system may be managed with higher efficiency.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
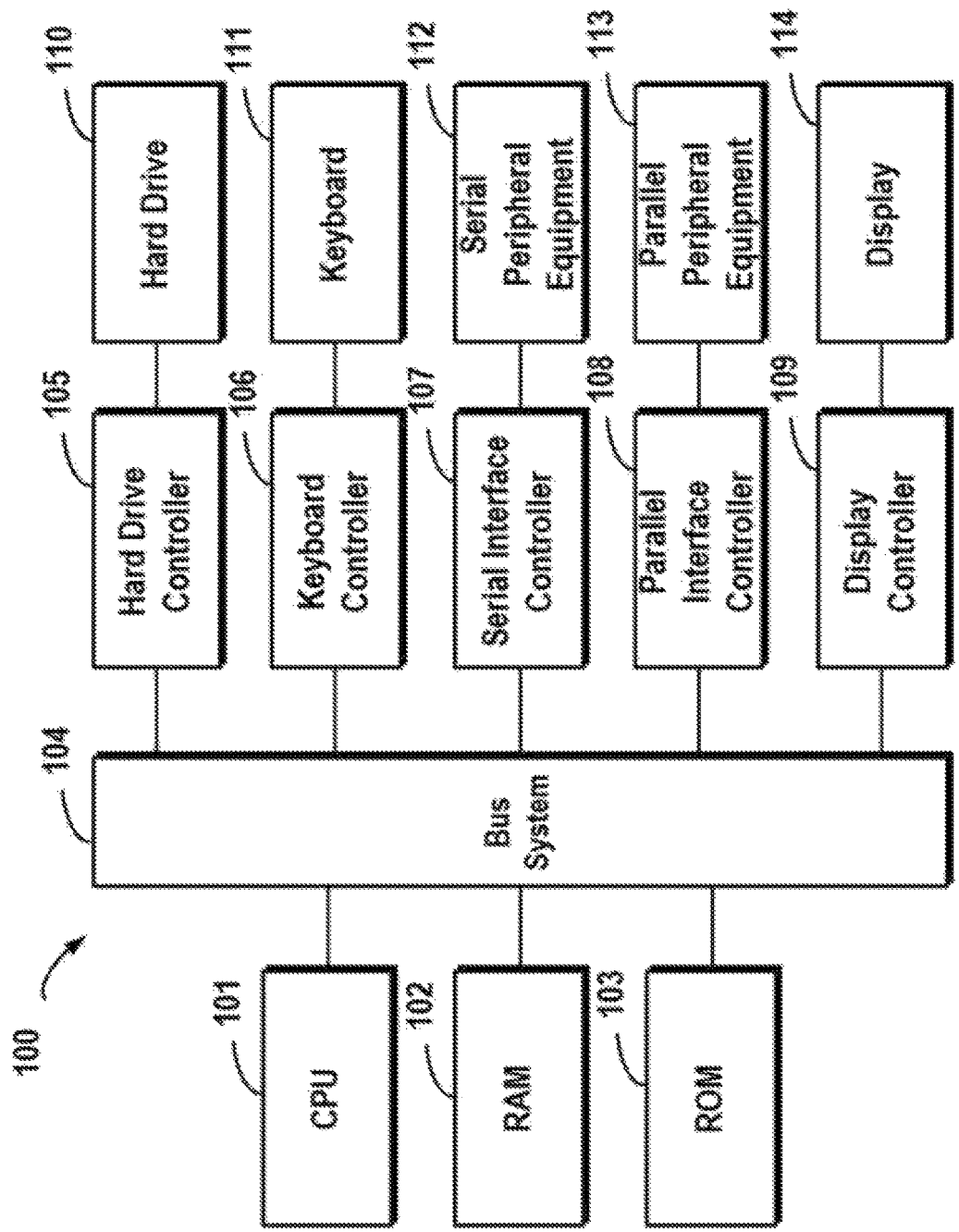
FIG. 1 schematically illustrates a block diagram of an exemplary computer system which is applicable to implement the embodiments of the present invention.

FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
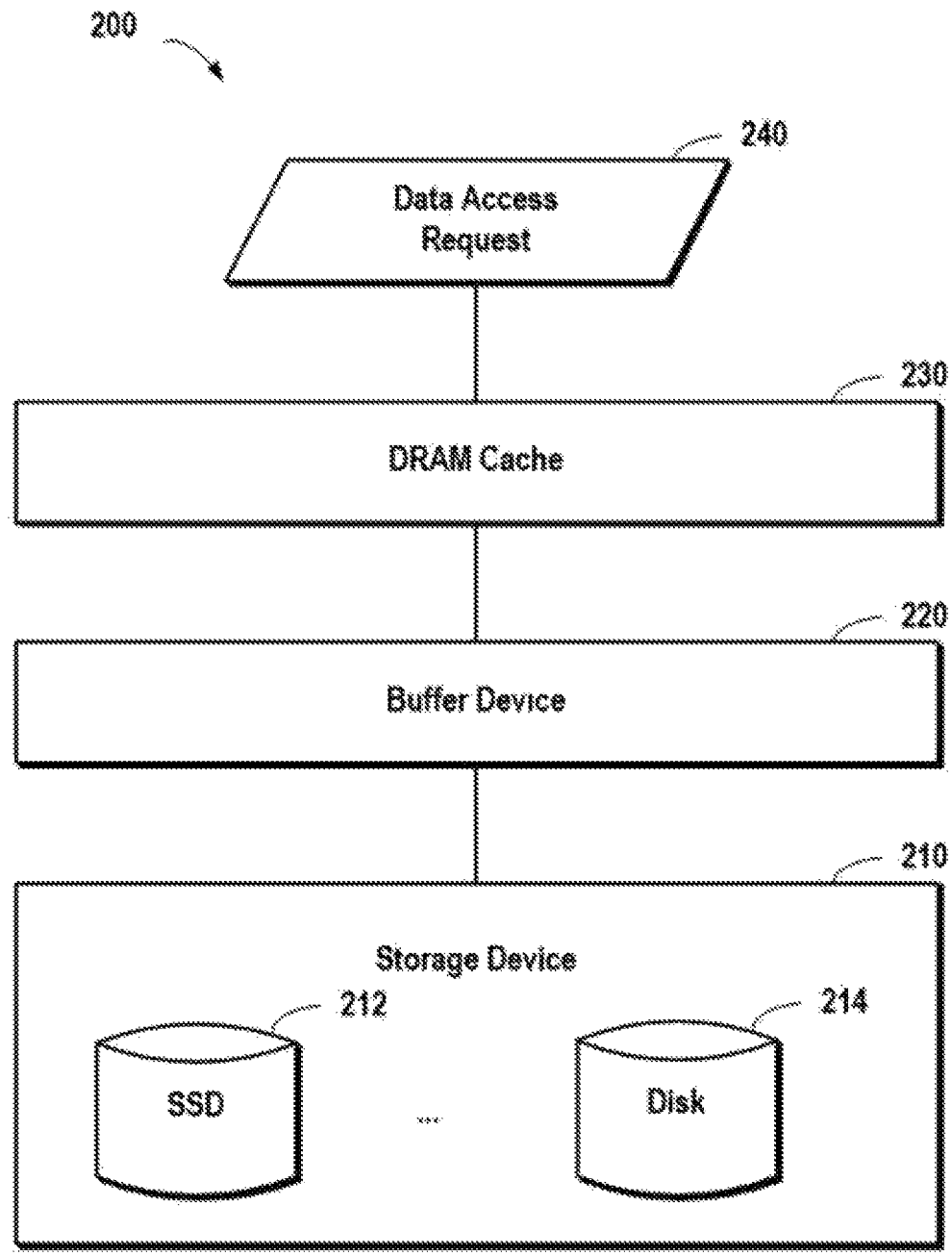
FIG. 2 schematically illustrates a block diagram an application environment where the embodiments of the present invention may be implemented.

FIG. 2 shows a schematic view 200 of an application environment in which the embodiments of the present invention may be implemented. As shown in FIG. 2, a storage system may comprise, for example, three layers of storage structures: a storage device 210 is an underlying storage device, e.g., may comprise a solid state disk (SSD) 212 and/or a disk 214; the storage device 210 has a lower data access speed, whereas a type of storage media has a large storage capacity and is cheap, and thus may provide a large capacity of data storage for a data system. A buffer device 220 (e.g., solid state cache) has a quite high data access speed; this type of storage media may be used as a buffer device, and recently accessed data may be loaded from the storage device 210 to the buffer device so as to provide higher response efficiency for future data access. A dynamic random access memory (DRAM) cache 230 has a much faster data access speed, to which the most recently accessed data or important data may be loaded, so that data access requests may be served with higher efficiency.

When the storage system receives a data access request 240, a search may be sequentially conducted in the DRAM cache 230 and the buffer device 220, and if the search hits, the received access request 240 may be served directly on the basis of data in these fast devices; if the search misses, then data has to be fetched from the slow storage device 210. In this way, the three-layer storage structures 210, 220 and 230 may work in coordination so as to provide a rapid data response.

According to existing technical solutions, the buffer device 220 is at the upper level of the storage device 210, and data in different types of the storage device 210 (e.g., the SSD 212 and the disk 214) may all be loaded to the buffer device 220. However, different storage devices may vary in access speed, state and importance of data stored therein. Therefore, it is desirable to develop a technical solution capable of prioritizing storage devices and further allocating and scheduling a page space in a buffer device on the basis of the priorities.

To this end, one embodiment of the present invention proposes a method for managing a buffer device in a storage system. The method comprises: determining a first priority for a first queue included in the buffer device, the first queue comprising at least one data page associated with a first storage device in the storage system; in at least one round, in response to the first priority not satisfying a first predetermined condition, updating the first priority according to a first updating rule, the first updating rule making the updated first priority much closer to the first predetermined condition than the first priority; and in response to the first priority satisfying the first predetermined condition, flushing data in a data page in the first queue to the first storage device.

Figure 3:
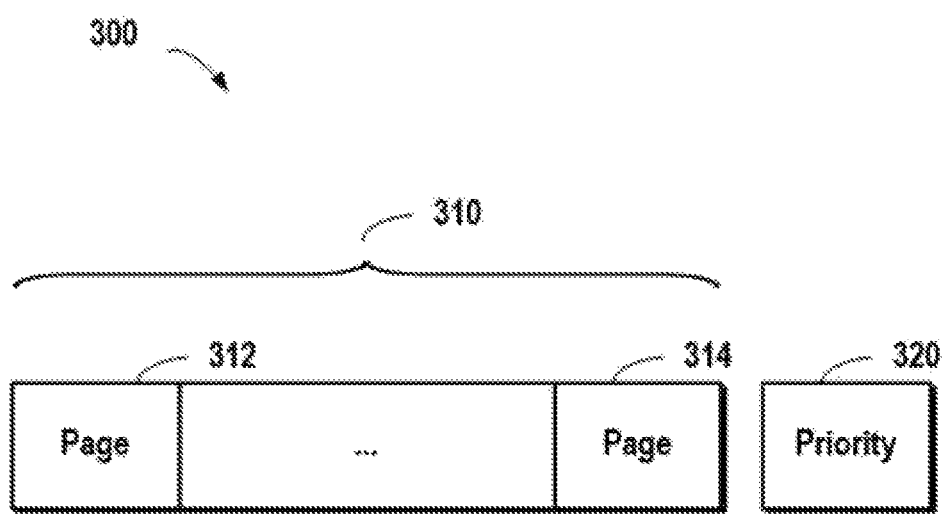
FIG. 3 schematically illustrates a block diagram of a solution for managing a buffer device in a storage system according to one embodiment of the present invention.

Specifically, FIG. 3 schematically shows a block diagram 300 of a solution for managing a buffer device in a storage system according to one embodiment of the present invention. As shown in FIG. 3, a queue 310 comprises at least one data page 312, . . . , 314 associated with a storage device in the storage system, for example, the at least one data page 312, . . . , 314 being loaded from the disk 214 as shown in FIG. 2 to the buffer device 220. Here, a priority 320 may be determined for the queue 310 so as to represent whether a page in the queue should be flushed to a corresponding storage device in each round of flush operation.

In one embodiment of the present invention, the storage device shown here may be a physical storage device of a physical disk, or may be a virtual storage device. For example, the storage device may be represented by an identifier of a physical device, or may further be represented by a logical address (e.g., logical unit number (LUN)). Although only one queue 310 is illustrated in FIG. 3, more queues may be provided. For example, among storage devices of a redundant array of independent disks (RAID), each storage device may be provided with one queue. Or each LUN may be provided with one queue.

Figure 4:
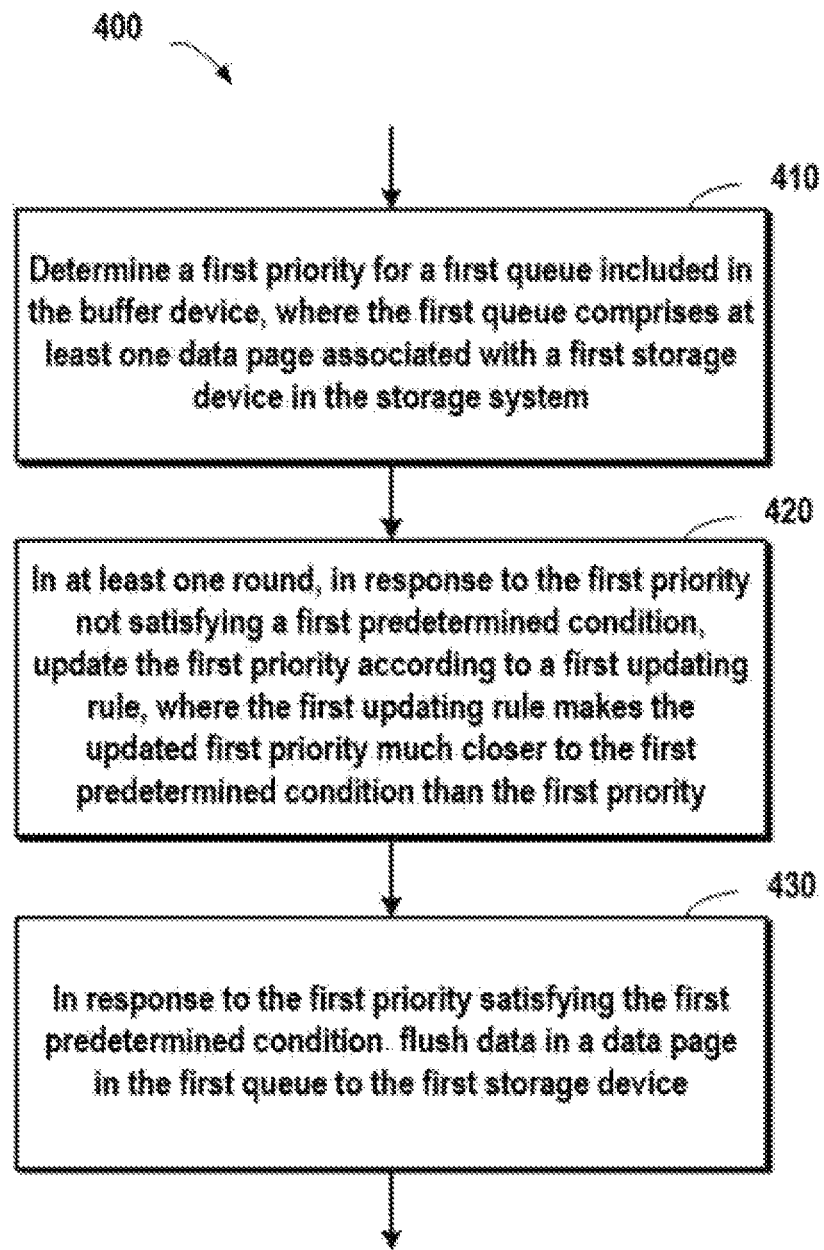
FIG. 4 schematically illustrates a flowchart of a method for managing a buffer device in a storage system according to one embodiment of the present invention.

On the basis of the structure shown in FIG. 3, in each round of operation, whether flushing operation is performed to one or more pages in the queue may be determined by judging whether the priority satisfies a predetermined condition. Further a value of the priority of the queue may be modified, and in the next round whether a flush is performed or not may be determined on the basis of the modified priority. With reference to FIG. 4, a detailed description is presented below to concrete steps of the method of the present invention.

FIG. 4 schematically shows a flowchart 400 of a method for managing a buffer device in a storage system according to one embodiment of the present invention. Specifically, in step 410 a first priority is determined for a first queue included in the buffer device, where the first queue comprises at least one data page associated with a first storage device in the storage system. In this step, the queue and the priority may be stored using the structure as shown in FIG. 3. For example, a priority field according to the present invention may be stored in association with a queue in the prior technical solution, so as to set a priority for a queue. In this step, the priority may be stored using various formats. For example, the priority may be represented as an integer, a real number or other format.

Note in this step the at least one data page in the first queue may involve multiple circumstances. For example, the data page may be page which, in response to receiving a read request with respect to the first storage device, is loaded from the first storage device to the buffer device. For another example, the data page may further be a page which, in response to receiving a write request with respect to the first storage device, is temporarily written to the buffer device and will finally be flushed to the first storage device.

In step 420, in at least one round, in response to the first priority not satisfying a first predetermined condition, the first priority is updated according to a first updating rule, the first updating rule making the updated first priority much closer to the first predetermined condition than the first priority. Concrete content of the predetermined condition may be customized. For example, when the priority is represented as an integer or a real number, the predetermined condition may be set to a condition such as "priority=0" or "priority☐0." Concrete content of the updating rule may also be customized. For example, when the priority is represented as an integer or a real number, the updating rule may be set as: using a current priority minus/plus one step length as the updated priority. Note the updating rule here should try to make the updated priority much closer to the predetermined condition than a current priority.

In step 430, in response to the first priority satisfying the first predetermined condition, data in a data page in the first queue is flushed to the first storage device.

For the sake of description, an integer will be used as a specific example of the priority. For example, a priority "2" may be assigned to the queue, the predetermined condition may be "priority=0," and the updating rule may be "updated priority=current priority −1". At this point, in the first round a priority 3 does not satisfy the predetermined condition, so the priority should be updated as 3−1=2. A page in the queue will not be flushed to a storage device. In the second round, a priority 2 also does not satisfy the predetermined condition, so the priority should be updated as 2−1=1. At this point, the page in the queue will not be flushed to the storage device. In the third round, the priority is updated as 1−1=0 and thus satisfies the predetermined condition "priority=0" at this point. So the page (e.g., one or more pages) in the queue may be flushed to the storage device.

The priority of the queue may be determined on the basis of various factors. Specifically, in one embodiment of the present invention, the first priority may be set on the basis of at least one of: a response time associated with the first storage device, a usage rate of the buffer device by the first storage device, and an access frequency of access requests with respect to the first storage device.

In this embodiment, the priority of a storage device might be susceptible to various factors. For example, if the storage device has a quite long response time, this means its access speed is rather slow, at which point a page associated with the storage device should be saved in the buffer device with a faster access speed for as long as possible (for example, data associated with a write request and to be written to the storage device, or data associated with a read request and stored in the storage device).

For another example, if data associated with a storage device has taken up most storage spaces in the buffer device (e.g., a high usage rate), this means only less storage spaces in the buffer device can serve other storage devices, at which point the usage rate associated with the storage device can be decreased properly (for example, data in one or more pages in the queue will be flushed to the storage device).

For another example, if the frequency (e.g., represented as inputs/outputs per second (IOPS)) of received access requests with respect to a storage device is quite high, this means data in the storage device is more likely to be accessed, so in the buffer device more spaces are supposed to be allocated for the storage device.

In one embodiment of the present invention, the setting the first priority comprises at least one of: in response to an increment of the response time being larger than or equal to a first predetermined threshold, increasing the first priority; in response to an increment of the usage rate being larger than or equal to a second predetermined threshold, decreasing the first priority; and in response to an increment of the access frequency being larger than or equal to a third predetermined threshold, increasing the first priority. Specifically, a value of the priority may be calculated from Formula 1 as below:

$$S = \frac{\alpha \cdot r \cdot \gamma \cdot f}{\beta \cdot u} \qquad \text{Formula 1}$$

Wherein S represents a value of the first priority, r represents a response time (e.g., denoted in milliseconds) associated with the first storage device, u represents the usage rate (e.g., denoted in percentage) of the first storage device in utilization of the buffer device, f represents an access frequency of access requests (e.g., denoted in IOPS) with respect to the first storage device, and α, β and γ each represent a customized weight.

In one embodiment of the present invention, a value of the priority may further be calculated on the basis of other formula. For example, the calculation may be based on Formula 2 (parameters in Formula 2 are defined in the same way as parameters in Formula 1). Or those skilled in the art may further customize other formula to determine the priority of the queue.

$$S = \alpha \cdot r + \gamma \cdot f - \beta \cdot u \qquad \text{Formula 2}$$

In this embodiment, the calculated priority may be normalized within a predetermined range, for example, the calculated value may be mapped to a range [0-10]. The updating rule may be defined on the basis of a range of priorities. For example, the size of a step length in the updating rule may be determined on the basis of a value range of priorities. Regarding the range [0-10], a decreasing step length in the updating rule may be set to 1. At this point, if the priority of a queue is 10, then the queue will go through flushing operation in the 10th round. If the decreasing step length is 2, then the queue will go through flushing operation in the 5th round.

In one embodiment of the present invention, the flushing data in one data page of the at last one data page to the first storage device comprises: selecting a target page from the first queue according to the least recently used (LRU) standard; and flushing data in the target page to the first storage device.

Figure 5:
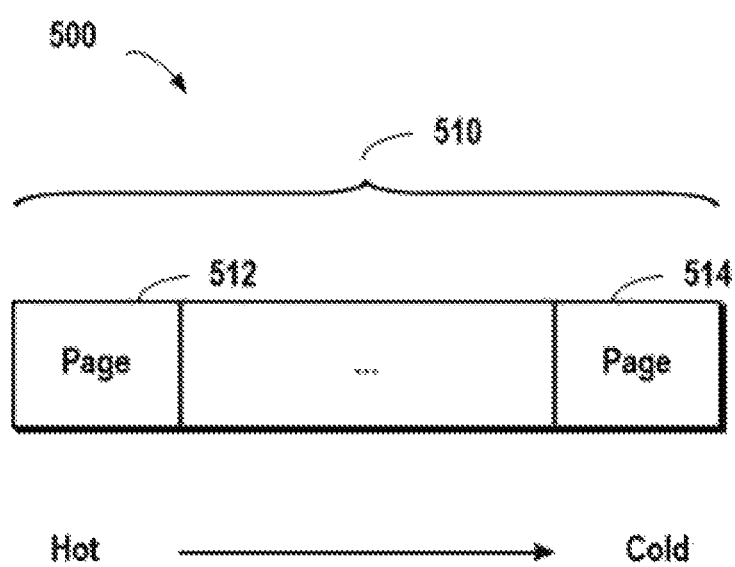
FIG. 5 schematically illustrates a block diagram of a queue for managing a buffer device in a storage system according to one embodiment of the present invention.

In this embodiment, a target page to be flushed may be selected on the basis of the LRU standard. Alternatively, queues may be ranked according to the LRU standard. FIG. 5 schematically shows a block diagram 500 for managing a queue in a buffer device in a storage system. As shown in FIG. 5, a queue 510 comprises pages 512, . . . , 514, and these pages may be ranked in hot-to-cold order. In this way, when it is determined on the basis of priorities that data in the queue needs to be flushed, the coldest page 514 may be selected from the end of the queue 510 as the target page.

Concrete steps of operation performed to a queue associated with a storage device have been described with reference to FIGS. 3 to 5. Note in the embodiments of the present invention, the buffer device may further comprise multiple queues, and each of the multiple queues may comprise pages associated with a corresponding storage device. Each queue may have its own priority, and the method described with reference to FIGS. 3 to 5 may be performed to each queue.

In one embodiment of the present invention, there is further comprised: determining a second priority for a second queue included in the buffer device, where the second queue comprises at least one data page associated with a second storage device in the storage system; in the at least one round, in response to the second priority not satisfying a second predetermined condition, updating the second priority according to a second updating rule, where the second updating rule makes the updated second priority much closer to the second predetermined condition than the second priority; and in response to the second priority satisfying the second predetermined condition, flushing data in a data page in the second queue to the second storage device.

In this embodiment, the second queue is a queue different than the first queue, and the priority, predetermined condition and updating rule for the second queue are either the same as or different than those for the first queue. For example, suppose two storage devices in the storage system have completely same configurations and running states, at this point respective priorities, predetermined conditions and updating rules for the two storage devices may be identical. For another example, if configurations and running states of two storage devices differ, then different priorities, predetermined conditions and updating rules may be set for the two storage devices.

Figure 6A:
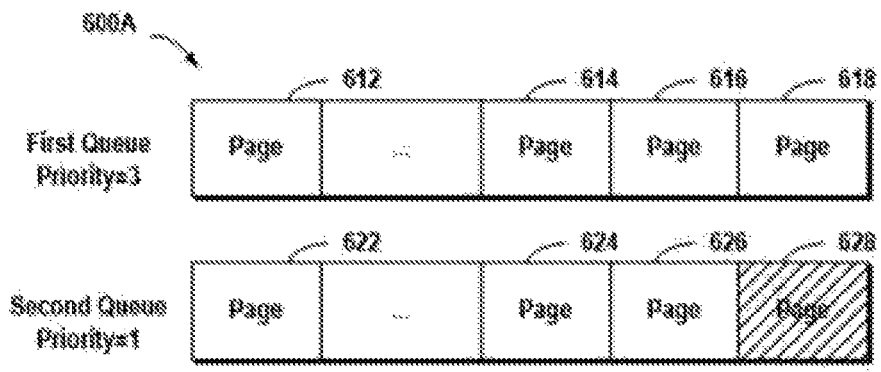
FIGS. 6A, 6B and 6C schematically illustrate respective block diagrams of different stages for managing a buffer device in a storage system according to one embodiment of the present invention.
Figure 6B:
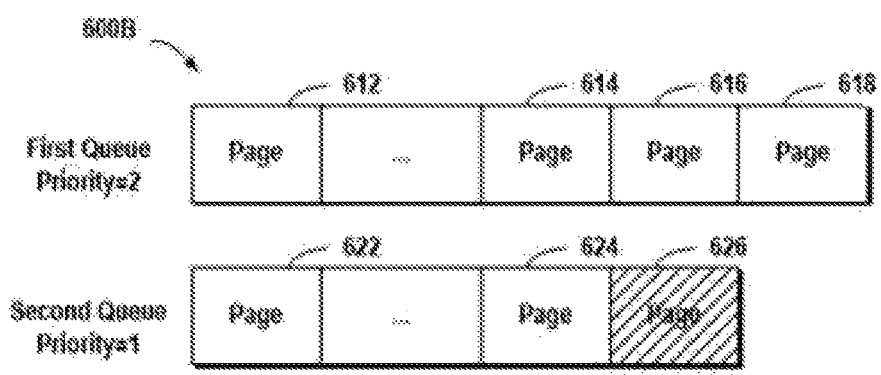
Figure 6C:
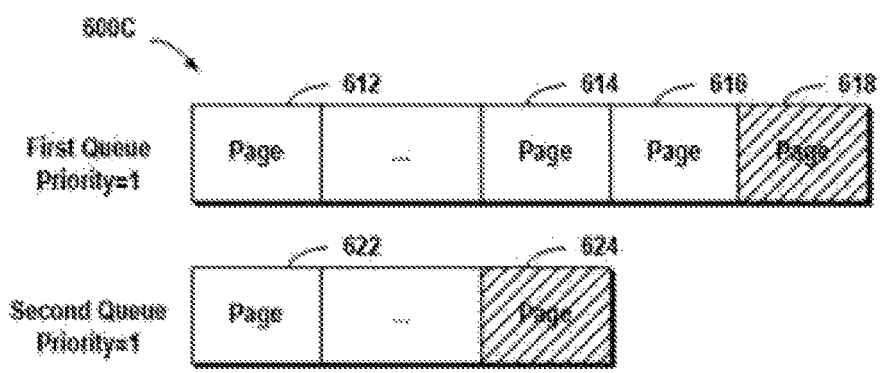

With reference to FIGS. 6A to 6C, description is presented below to details of this embodiment. Specifically, FIGS. 6A to 6C schematically show block diagrams 600A, 600B and 600C of different rounds for managing a buffer device in a storage system according to one embodiment of the present invention. In this embodiment, an initial priority of the first queue is 3, and an initial priority of the second queue is 1. Suppose predetermined conditions for the two queues are identical, i.e., "priority=0," and updating rules for both queues are updated priority=current priority-1.

As shown in FIG. 6A, the first queue comprises pages 612, . . . , 614, 616 and 618, the second queue comprises pages 622, . . . , 624, 626 and 628. With the method described above, in the first round, the priority of the first queue is updated as 3-1=2, and the priority of the second queue is updated as 1-1=0 (satisfying the predetermined condition). At this point, the page 628 at the end of the second queue will be flushed to the second storage device associated with the second queue.

FIG. 6B shows details of the second round, at which point 1 will be assigned to the priority of the second queue as the priority has satisfied the predetermined condition. In the second round, the priority of the first queue is updated as 2-1=1, and the priority of the second queue is updated as 1-1=0 (satisfying the predetermined condition). At this point, the page 626 at the end of the second queue will be flushed to the second storage device associated with the second queue.

FIG. 6C shows details of the third round, at which point 1 will be assigned to the priority of the second queue. In the third round, the priority of the first queue is updated as 1-1=0 (satisfying the predetermined condition), at which point the page 618 at the end of the first queue will be flushed to the first storage device associated with the first queue. The priority of the second queue is updated as 1-1=0 (satisfying the predetermined condition), at which point the page 624 at the end of the second queue will be flushed to the second storage device associated with the second queue.

In one embodiment of the present invention, the first storage device is provided with a first level, the second storage device is provided with a second level, and the first level is higher than the second level. In this embodiment, multiple storage devices may have different priorities. For example, regarding the example shown in FIGS. 6A to 6C, since the level of the first storage device is higher than that of the second storage device, the first queue is set to a higher initial priority 3, and the second queue is set to a lower initial priority 1.

In the embodiment shown in FIGS. 6A to 6C, as priorities of the first queue and the second queue differ, the frequencies at which data in the two queues is flushed to respective storage devices also vary. Flushing operation is performed to the first queue only once in three rounds, while flushing operation is performed to the second queue three times in three rounds. In this embodiment, since the first queue has a higher initial priority, the first queue takes precedence over the second queue in utilizing storage resources in the storage device. In this way, corresponding page scheduling policies may be set for different storage devices in light of different priorities.

In one embodiment of the present invention, the determining a second priority for a second queue included in the buffer device comprises: setting the second priority such that the rate at which the second priority is updated to satisfy the second predetermined condition according to the second updating rule is faster than the rate at which the first priority is updated to satisfy the first predetermined condition according to the first updating rule.

A value of the second priority may be set using various approaches. For example, where the first and second updating rules are identical and the first and second predetermined conditions are identical, a value of the second priority may be set lower than that of the first priority. As shown in FIG. 6A, the first priority is set to 3, and the second priority is set to 1. In this way, the second priority will satisfy the second predetermined condition in the first round.

For another example, the second priority may further be set to the same value "3" as the first priority, but the second updating rule may be provided with a larger decreasing step length, e.g., "3." In this way, the second priority will satisfy the second predetermined condition in the first round.

For another example, both the second priority and the first priority may be set to "3," and both the second updating rule and the first updating rule may be set to "minus 1," but the second predetermined condition may be set as "priority=2." In this way, the second priority will satisfy the second predetermined condition in the first round. Note specific examples of how to set the priority, predetermined condition and updating rule have been provided for the illustration purpose only. According to requirements of concrete application environments, other methods may further be used to perform functions of the technical solution described herein.

Figure 7:
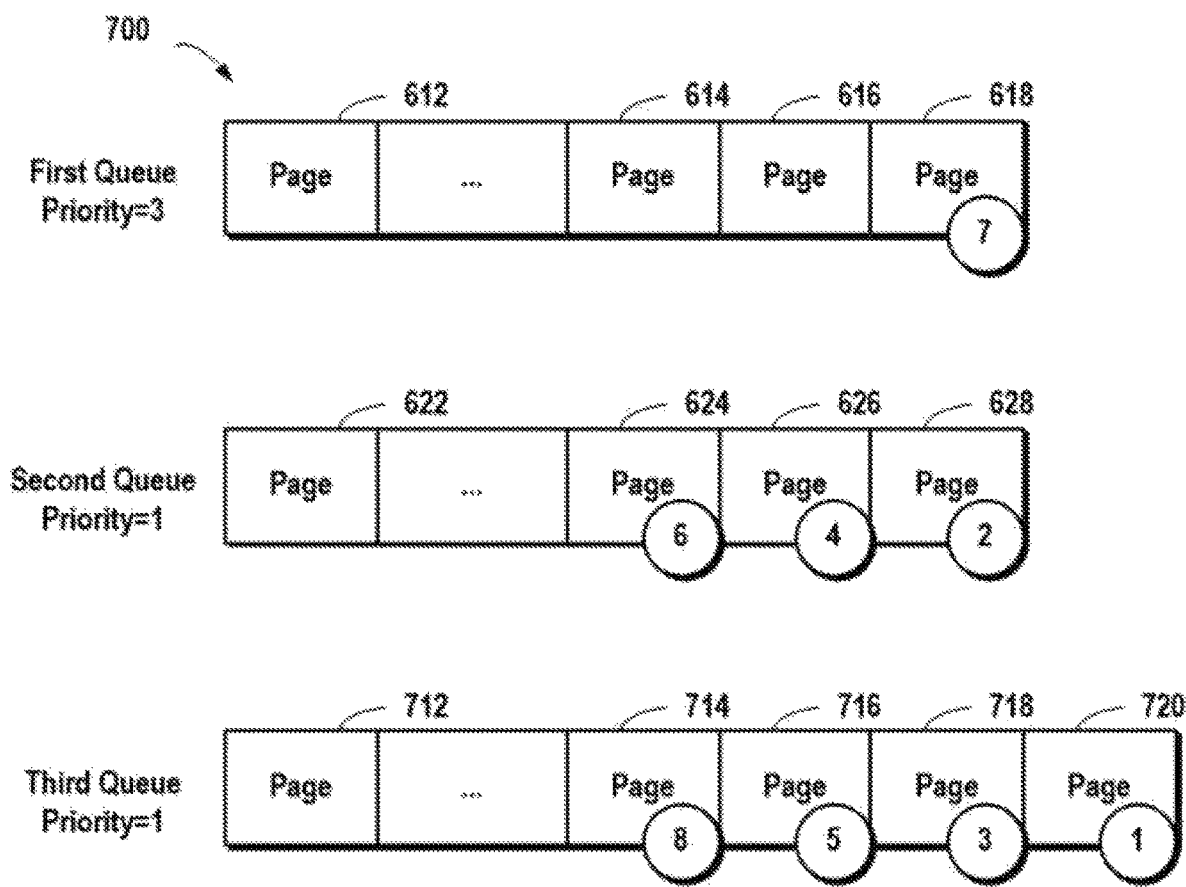
FIG. 7 schematically illustrates a block diagram for managing a buffer device in a storage system according to one embodiment of the present invention.

While the example in which two queues are involved has been described in detail above, in other embodiments the buffer device may further comprise more queues. FIG. 7 schematically shows a block diagram 700 for managing a buffer device in a storage system according to one embodiment of the present invention. As shown in FIG. 7, suppose a first, second, third queues are associated with a first, second, third storage devices respectively, and the levels of the three queues meet such a relation as the first level>the second level=the third level. At this point, a higher priority 3 may be assigned to the first queue, and a lower priority 1 may be assigned to each of the second and third queues.

With the method described above, suppose in each round the three queues are processed in an order from bottom to top of FIG. 7, then in the first round, both priorities of the third and second queues are 1, so a page 720 (denoted as circled 1 in FIG. 7) at the end of the third queue is first flushed, and then a page 628 at the end of the second queue is flushed. Since the priority of the first queue is 3-1=2, so pages in the first queue will not be flushed. In the second round, a page 718 in the third queue and a page 626 in the second queue are flushed. In the third round, a page 716 in the third queue, a page 624 in the second queue and a page 618 in the first queue are flushed. In this embodiment, pages are flushed in an order shown in circles in FIG. 7: the page 720, the page 628, the page 718, the page 626, the page 716, the page 624, and the page 618.

In one embodiment of the present invention, the storage system is a Redundant Array of Independent Disks, the first storage device is a failed storage device in the Redundant Array of Independent Disks, and the second storage device is a normal storage device in the Redundant Array of Independent Disks. In this embodiment, since the failed storage device in the RAID storage system is being rebuilt, to prevent conventional data access requests from interfering with rebuilding operation, more spaces in the buffer device may be allocated for the failed storage device to buffer data. Therefore, a higher priority may be set for the failed storage device, and a lower priority may be set for other normal storage device.

For example, in FIG. 7 the first queue may be a queue associated with the failed storage device, while the second and third queues may be queues associated with normal storage devices. As shown in FIG. 7, during flushing, pages in the second and third queues are flushed to corresponding normal storage devices in each round, while a page in the first queue is not flushed until the third round. With the technical solution of the present invention, more spaces may be reserved in the buffer device for the failed storage device.

Figure 8A:
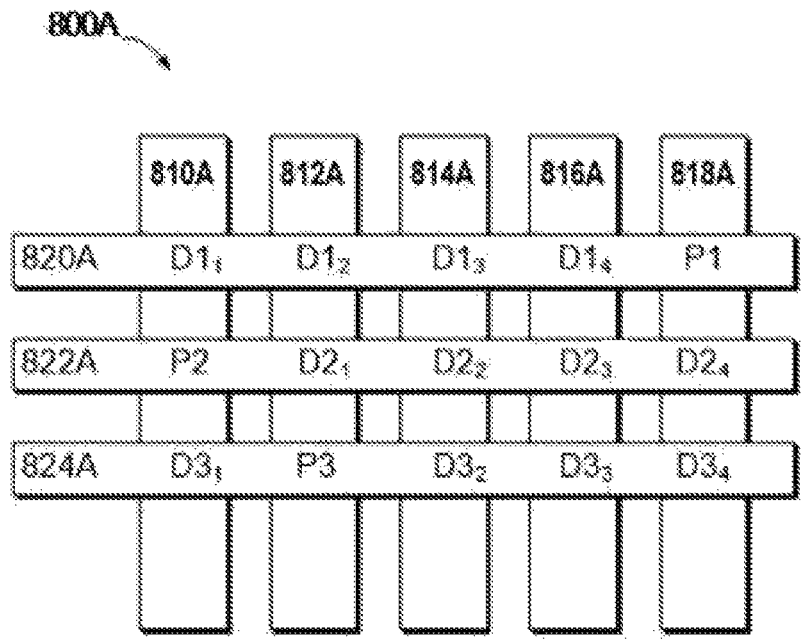
FIGS. 8A and 8B each schematically illustrate a block diagram of an application environment in which the embodiments of the present invention.

FIG. 8A schematically illustrates a schematic view 800A of a structure of RAID according to one technical solution. In this figure, working principles of RAID are illustrated by taking RAID-5, which consists of five independent storage devices (810A, 812A, 814A, 816A and 818A), as an example. It should be noted although five storage devices are illustrated in FIG. 8A, in other embodiments more or less storage devices may be provided according to different versions of RAID. Moreover, although FIG. 8A shows stripes 820A, 822A and 824A, in other examples the RAID system may further comprise a different number of stripes.

In RAID, a stripe crosses multiple physical storage devices (for example, the stripe 820A crosses the storage devices 810A, 812A, 814A, 816A and 818A). The stripe may simply be construed as a storage area among multiple storage devices which satisfies a given address range. Data stored in the stripe 820 comprises multiple parts: a data block $D1_1$ stored in the storage device 810A, a data block $D1_2$ stored in storage device the 812A, a data block $D1_3$ stored in the storage device 814A, a data block $D1_4$ stored in the storage device 816A, and a data block P1 stored in the storage device 818A. In this example, the data blocks $D1_1$, $D1_2$, $D1_3$ and $D1_4$ are stored data, and the data block P1 is a parity of the stored data.

The mode of storing data in other stripes is similar to that in the stripe 820A, and the difference is that a checksum about other data block may be stored in other storage device than the storage device 818A. In this way, when one of the multiple storage devices 810A, 812A, 814A, 816A and 818A fails, data in the failing device may be recovered from other normal storage devices.

Figure 8B:
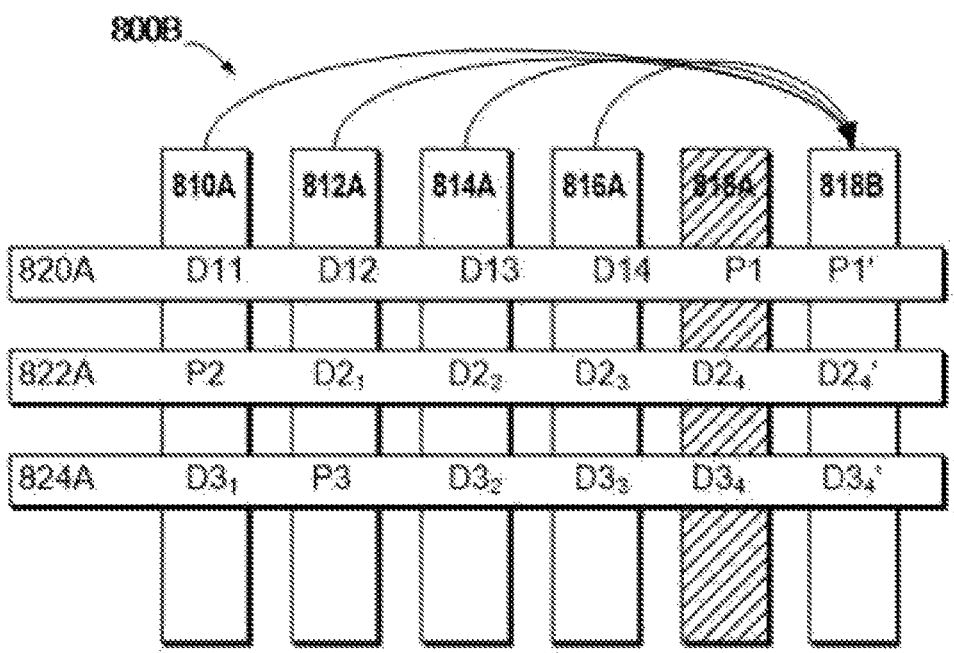

FIG. 8B schematically shows a schematic view 800B of rebuilding process of RAID according to one technical solution. As shown in FIG. 8B, when one storage device (e.g., the storage device 818A shown in shadow) fails, data may be recovered from the remaining storage devices 810A, 812A, 814A and 816A that operate normally. At this point, a new backup storage device 818B may be added to RAID to replace the storage device 818A. In this way, recovered data may be written to 818B, and a system rebuilding may be effected.

The embodiments of the present invention may be applied to the RAID storage system shown in FIGS. 8A and 8B. Specifically, the failed storage device 818A shown in FIG. 8B may be the first storage device mentioned in the present invention, and the further normal storage devices 810A, 812A, 814A, and 816A may be the multiple second storage devices. Note in this embodiment since the first queue is associated with the failed storage device 818A to which data cannot be directly written during flushing, according to working principles of the RAID storage system, data is written to the further normal storage devices 810A, 812A, 814A and 816A in the RAID storage system.

In one embodiment of the present invention, a data access speed of the first storage device is lower than a data access speed of the second storage device. In this embodiment, more buffer spaces may be allocated for a storage device with a lower data access speed. For example, the access speed of a storage device of hard disk type might be slower than that of a storage device of solid state storage medium type, so more buffer spaces may be provided in the buffer device for the hard disk storage device.

In one embodiment of the present invention, different services may be provided to different users according to levels of the users in the storage system. For example, more buffer spaces may be provided for an important user, while less buffer spaces may be provided for an ordinary user.

In one embodiment of the present invention, the method is executed in response to any of: insufficiency of available spaces in the buffer device, and external invocation. The method of the present invention may be executed in different stages of the running of the storage system. For example, the method may be executed where available spaces in the buffer device are insufficient, may be periodically executed, or may be executed in response to invocation.

Figure 9:
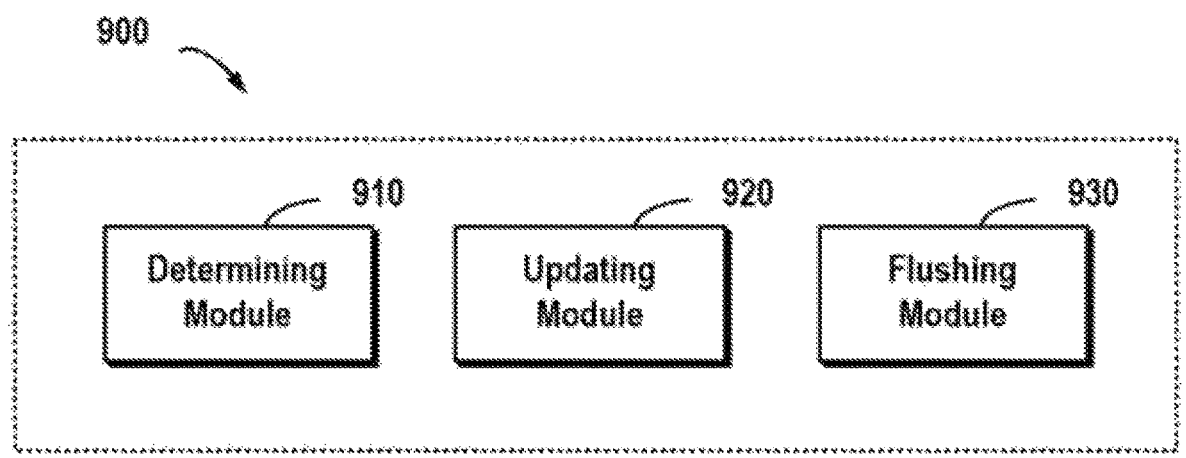
FIG. 9 schematically illustrates a block diagram of a device for managing a buffer device in a storage system according to one embodiment of the present invention.

FIG. 9 schematically shows a block diagram 900 of a device for managing a buffer device in a storage system according to one embodiment of the present invention. Specifically, there is provided a device for managing a buffer device in a storage system, comprising: a determining module 910 configured to determine a first priority for a first queue included in the buffer device, the first queue comprising at least one data page associated with a first storage device in the storage system; an updating module 920 configured to, in at least one round, in response to the first priority not satisfying a first predetermined condition, update the first priority according to a first updating rule, the first updating rule making the updated first priority much closer to the first predetermined condition than the first priority; and a flushing module 930 configured to, in response to the first priority satisfying the first predetermined condition, flush data in a data page in the first queue to the first storage device.

In one embodiment of the present invention, the determining module 910 is further configured to set the first priority on the basis of at least one of: a response time associated with the first storage device, a usage rate of the buffer device by the first storage device, and an access frequency of access requests with respect to the first storage device.

In one embodiment of the present invention, the determining module 910 is further configured to: in response to an increment of the response time being larger than or equal to a first predetermined threshold, increase the first priority; in response to an increment of the usage rate being larger than or equal to a second predetermined threshold, decrease the first priority; and in response to an increment of the access frequency being larger than or equal to a third predetermined threshold, increase the first priority.

In one embodiment of the present invention, the flushing module 930 is further configured to select a target page from the first queue according to the least recently used standard; and flush data in the target page to the first storage device.

In one embodiment of the present invention, the determining module is further configured to determine a second priority for a second queue included in the buffer device, the second queue comprising at least one data page associated with a second storage device in the storage system; the updating module is further configured to, in the at least one round, in response to the second priority not satisfying a second predetermined condition, update the second priority according to a second updating rule, the second updating rule making the updated second priority much closer to the second predetermined condition than the second priority; and the flushing module is further configured to, in response to the second priority satisfying the second predetermined condition, flush data in a data page in the second queue to the second storage device.

In one embodiment of the present invention, the first storage device is provided with a first level, the second storage device is provided with a second level, and the first level is higher than the second level.

In one embodiment of the present invention, the determining module 910 is further configured to: set the second priority such that the rate at which the second priority is updated to satisfy the second predetermined condition according to the second updating rule is faster than the rate at which the first priority is updated to satisfy the first predetermined condition according to the first updating rule.

In one embodiment of the present invention, the storage system is a Redundant Array of Independent Disks, the first storage device is a failed storage device in the Redundant Array of Independent Disks, and the second storage device is a normal storage device in the Redundant Array of Independent Disks.

In one embodiment of the present invention, a data access speed of the first storage device is lower than a data access speed of the second storage device.

In one embodiment of the present invention, the determining module 910, the updating module 920 and the flushing module 930 operate in response to any of: insufficiency of available spaces in the buffer device, and invocation.

In one embodiment of the present invention, there is provided a system for managing a buffer device in a storage system, the system comprising: one or more processors; a memory coupled to at least one processor of the one or more processors; computer program instructions stored in the memory which, when executed by the at least one processor, cause a device to execute a method for managing a storage system. The method comprising: determining a first priority for a first queue included in the buffer device, the first queue comprising at least one data page associated with a first storage device in the storage system; in at least one round, in response to the first priority not satisfying a first predetermined condition, updating the first priority according to a first updating rule, the first updating rule making the updated first priority much closer to the first predetermined condition than the first priority; and in response to the first priority satisfying the first predetermined condition, flushing data in a data page in the first queue to the first storage device.

In one embodiment of the present invention, the determining a first priority for a first queue included in the buffer device comprises: setting the first priority on the basis of at least one of: a response time associated with the first storage device, a usage rate of the buffer device by the first storage device, and an access frequency of access requests with respect to the first storage device.

In one embodiment of the present invention, the setting the first priority comprises at least one of: in response to an increment of the response time being larger than or equal to a first predetermined threshold, increasing the first priority; in response to an increment of the usage rate being larger than or equal to a second predetermined threshold, decreasing the first priority; and in response to an increment of the access frequency being larger than or equal to a third predetermined threshold, increasing the first priority.

In one embodiment of the present invention, the flushing data in one data page of the at last one data page to the first storage device comprises: selecting a target page from the first queue according to the least recently used (LRU) standard; and flushing data in the target page to the first storage device.

In one embodiment of the present invention, there is further comprised: determining a second priority for a second queue included in the buffer device, the second queue comprising at least one data page associated with a second storage device in the storage system; in the at least one round, in response to the second priority not satisfying a second predetermined condition, updating the second priority according to a second updating rule, the second updating rule making the updated second priority much closer to the second predetermined condition than the second priority; and in response to the second priority satisfying the second predetermined condition, flushing data in a data page in the second queue to the second storage device.

In one embodiment of the present invention, the first storage device is provided with a first level, the second storage device is provided with a second level, and the first level is higher than the second level.

In one embodiment of the present invention, the determining a second priority for a second queue included in the buffer device comprises: setting the second priority such that the rate at which the second priority is updated to satisfy the second predetermined condition according to the second updating rule is faster than the rate at which the first priority is updated to satisfy the first predetermined condition according to the first updating rule.

In one embodiment of the present invention, the storage system is a Redundant Array of Independent Disks, the first storage device is a failed storage device in the Redundant Array of Independent Disks, and the second storage device is a normal storage device in the Redundant Array of Independent Disks.

In one embodiment of the present invention, a data access speed of the first storage device is lower than a data access speed of the second storage device.

In one embodiment of the present invention, the method is executed in response to any of: insufficiency of available spaces in the buffer device, and invocation.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for managing a buffer device in a storage system, comprising:
   determining a first priority for a first queue included in the buffer device, the first queue comprising at least one data page associated with a first storage device in the storage system;
   in at least one round,
      in response to the first priority not satisfying a first predetermined condition, updating the first priority according to a first updating rule, the first updating rule making the updated first priority closer to the first predetermined condition than the first priority; and
      in response to the first priority satisfying the first predetermined condition, flushing data in a data page in the first queue to the first storage device without immediately flushing all data in the buffer device,
      wherein the determining a first priority for a first queue included in the buffer device comprises setting the first priority on the basis of at least one of: a response time associated with the first storage device, a usage rate of the buffer device by the first storage device, and an access frequency of access requests with respect to the first storage device,
   wherein the method further comprises:
      determining a second priority for a second queue included in the buffer device, the second queue comprising at least one data page associated with a second storage device in the storage system, the first storage device and the second storage device belonging to a Redundant Array of Independent Disks (RAID); and
      in response to detecting that (i) the first storage device is a failed device being rebuilt in the RAID and (ii) the second storage device is a non-failed device in the RAID, assigning a higher priority to the first queue than to the second queue, thereby preventing conventional data access requests from interfering with rebuilding the first storage device.

2. The method according to claim 1, wherein the setting the first priority comprises at least one of:
   in response to an increment of the response time being larger than or equal to a first predetermined threshold, increasing the first priority;
   in response to an increment of the usage rate being larger than or equal to a second predetermined threshold, decreasing the first priority; and
   in response to an increment of the access frequency being larger than or equal to a third predetermined threshold, increasing the first priority.

3. The method according to claim 1, wherein the flushing data in one data page of the at last one data page to the first storage device comprises:
   selecting a target page from the first queue according to a least recently used standard; and
   flushing data in the target page to the first storage device.

4. The method according to claim 1, further comprising, in the at least one round,
   in response to the second priority not satisfying a second predetermined condition, updating the second priority according to a second updating rule, the second updating rule making the updated second priority closer to the second predetermined condition than the second priority; and
   in response to the second priority satisfying the second predetermined condition, flushing data in a data page in the second queue to the second storage device.

5. The method according to claim 4, wherein
   the first storage device is provided with a first level, the second storage device is provided with a second level, and the first level is higher than the second level.

6. The method according to claim 5, wherein the determining a second priority for a second queue included in the buffer device comprises:
   setting the second priority such that the rate at which the second priority is updated to satisfy the second predetermined condition according to the second updating rule is faster than the rate at which the first priority is updated to satisfy the first predetermined condition according to the first updating rule.

7. The method according to claim 5, wherein
   a data access speed of the first storage device is lower than a data access speed of the second storage device.

8. The method according to claim 1, wherein the method is executed in response to any of:
   insufficiency of available spaces in the buffer device, and an invocation.

9. A system for managing a buffer device in a storage system, comprising:
   one or more processors;
   a memory coupled to at least one processor of the one or more processors;
   computer program instructions stored in the memory which, when executed by the at least one processor, cause the system to execute a method for managing a storage system, the method comprising:
   determining a first priority for a first queue included in the buffer device, the first queue comprising at least one data page associated with a first storage device in the storage system;
   in at least one round,
   in response to the first priority not satisfying a first predetermined condition, updating the first priority according to a first updating rule, the first updating rule making the updated first priority closer to the first predetermined condition than the first priority; and
   in response to the first priority satisfying the first predetermined condition, flushing data in a data page in the first queue to the first storage device,
      wherein the determining a first priority for a first queue included in the buffer device comprises setting the first priority on the basis of at least one of: a response time associated with the first storage device, a usage rate of the buffer device by the first storage device, and an access frequency of access requests with respect to the first storage device, wherein the method further comprises:
determining a second priority for a second queue included in the buffer device, the second queue comprising at least one data page associated with a second storage device in the storage system, the first storage device and the second storage device belonging to a Redundant Array of Independent Disks (RAID); and in response to detecting that (i) the first storage device is a failed device being rebuilt in the RAID and (ii) the second storage device is a non-failed device in the RAID, assigning a higher priority to the first queue than to the second queue, thereby preventing conventional data access requests from interfering with rebuilding the first storage device.

10. The system according to claim 9, wherein the setting the first priority comprises at least one of:
in response to an increment of the response time being larger than or equal to a first predetermined threshold, increasing the first priority;
in response to an increment of the usage rate being larger than or equal to a second predetermined threshold, decreasing the first priority; and
in response to an increment of the access frequency being larger than or equal to a third predetermined threshold, increasing the first priority.

11. The system according to claim 9, wherein the flushing data in one data page of the at last one data page to the first storage device comprises:
selecting a target page from the first queue according to a least recently used standard; and
flushing data in the target page to the first storage device.

12. The system according to claim 9, the method further comprising,
in the at least one round,
in response to the second priority not satisfying a second predetermined condition, updating the second priority according to a second updating rule, the second updating rule making the updated second priority closer to the second predetermined condition than the second priority; and
in response to the second priority satisfying the second predetermined condition, flushing data in a data page in the second queue to the second storage device.

13. The system according to claim 12, wherein
the first storage device is provided with a first level, the second storage device is provided with a second level, and the first level is higher than the second level.

14. The system according to claim 13, wherein the determining a second priority for a second queue included in the buffer device comprises:
setting the second priority such that the rate at which the second priority is updated to satisfy the second predetermined condition according to the second updating rule is faster than the rate at which the first priority is updated to satisfy the first predetermined condition according to the first updating rule.

15. A computer program product including one or more non-transitory computer readable medium(s) having computer readable program code embodied thereon which, when executed by one or more processors, perform a method for managing a buffer device in a storage system, the method comprising:

establishing, as a first numerical value, a first priority for a first queue included in the buffer device, the first queue including at least one data page associated with a first storage device in the storage system; and in at least one round of flush operation,
in response to the first priority not satisfying a first predetermined condition, updating the first numerical value according to a first updating rule, the first updating rule making the updated first numerical value closer to a numerical component of the first predetermined condition than the first numerical value is to the numerical component; and in response to the first priority satisfying the first predetermined condition, flushing data in a data page of the first queue to the first storage device, wherein establishing the first priority is performed based on at least one of (i) a response time associated with the first storage device, (ii) a usage rate of the buffer device by the first storage device, and (iii) an access frequency of access requests with respect to the first storage device, wherein the method further comprises:
determining a second priority for a second queue included in the buffer device, the second queue comprising at least one data page associated with a second storage device in the storage system, the first storage device and the second storage device belonging to a Redundant Array of Independent Disks (RAID); and in response to detecting that (i) the first storage device is a failed device being rebuilt in the RAID and (ii) the second storage device is a non-failed device in the RAID, assigning a higher priority to the first queue than to the second queue, thereby preventing conventional data access requests from interfering with rebuilding the first storage device.

16. The computer program product of claim 15, wherein the buffer device includes a second queue associated with a second storage device, and wherein the method further comprises:
establishing a second numerical value of priority for the second queue, the second numerical value differing from the first numerical value based on at least one of (i) differences in response times associated with the respective storage devices, (ii) differences in usage rates of the buffer device by the respective storage devices, and (iii) differences in access frequencies of access requests with respect to the respective storage devices.

17. The method of claim 16, wherein the at least one round of flush operation includes multiple rounds of flush operation, and wherein the method further comprises, upon each round of flush operation:
updating the numerical value of the priority of each of the first and second queues in accordance with a respective update rule;
comparing each updated numerical value of priority with a respective predetermined condition; and
for each of the queues for which the comparison satisfies the respective predetermined condition, flushing at least one data page from the respective queue.

* * * * *